US007987244B1

(12) United States Patent
Lewis et al.

(10) Patent No.: US 7,987,244 B1
(45) Date of Patent: Jul. 26, 2011

(54) NETWORK REPOSITORY FOR VOICE FONTS

(75) Inventors: Steven Hart Lewis, Middletown, NJ (US); Kenneth H. Rosen, Middletown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1213 days.

(21) Appl. No.: 11/275,221

(22) Filed: Dec. 20, 2005

Related U.S. Application Data

(60) Provisional application No. 60/640,933, filed on Dec. 30, 2004.

(51) Int. Cl.
*G06F 15/16* (2006.01)
*G06F 15/173* (2006.01)

(52) U.S. Cl. ......................... 709/219; 709/217; 709/223

(58) Field of Classification Search .......... 709/217–219, 709/223–224
See application file for complete search history.

(56) References Cited

U.S. PATENT DOCUMENTS

| | | | | |
|---|---|---|---|---|
| 5,907,675 | A * | 5/1999 | Aahlad | 709/203 |
| 5,940,796 | A * | 8/1999 | Matsumoto | 704/260 |
| 6,671,354 | B2 * | 12/2003 | Mahoney | 379/88.03 |
| 7,137,126 | B1 * | 11/2006 | Coffman et al. | 719/328 |
| 7,177,801 | B2 * | 2/2007 | Krasnanski et al. | 704/201 |
| 7,286,985 | B2 * | 10/2007 | Chiu | 704/260 |
| 7,349,848 | B2 * | 3/2008 | Akabane et al. | 704/260 |
| 7,440,894 | B2 * | 10/2008 | Zhou et al. | 704/243 |
| 7,440,899 | B2 * | 10/2008 | Otsuka et al. | 704/270.1 |
| 7,493,145 | B2 * | 2/2009 | Colson et al. | 455/563 |
| 7,693,719 | B2 * | 4/2010 | Chu et al. | 704/270.1 |
| 2004/0098266 | A1 | 5/2004 | Hughes et al. | |

* cited by examiner

*Primary Examiner* — Hussein A Elchanti

(57) ABSTRACT

A method, system, and machine-readable medium are provided for utilizing a network repository having stored voice font data. A request for a response, including the voice font data stored in the network repository; is received via a network. The voice font data stored in the network repository is accessed. The response, including the voice font data, is sent via the network.

19 Claims, 4 Drawing Sheets

300

| GENDER | AGE | LANGUAGE | ACCENT | TONE | QUALITY | RESTRICTIONS | NAME | PTR | |
|---|---|---|---|---|---|---|---|---|---|
| MALE | 20's | ENGLISH | SOUTHERN | ENERGETIC | HIGH | NONE | DREW | 1 | 302 |
| FEMALE | 6 | ENGLISH | MIDWESTERN | HAPPY | MEDIUM | NONE | LILY | 2 | 304 |
| FEMALE | 30's | ENGLISH | FRENCH | PLAYFUL | HIGH | PAY-FOR-USE | CELEB1 | 3 | 306 |
| MALE | 40's | SPANISH | MEXICAN | ANGRY | MEDIUM | USER-RESTRICTED | USER1 | 4 | 308 |

NETWORK REPOSITORY FOR VOICE FONTS

RELATED APPLICATIONS

This application claims the benefit of Provisional U.S. Patent Application 60/640,933, filed in the U.S. Patent and Trademark Office on Dec. 30, 2004 and incorporated by reference herein in its entirety.

BACKGROUND OF THE INVENTION

1. Field of the Invention

The present invention relates to utilization of voice fonts for speech synthesis applications and, more particularly, to creation and availability of a network-based voice font platform for use by network subscribers.

2. Introduction

Compression of speech data is an important problem in various applications. For example, in wireless communication and voice over IP (VoIP), effective real-time transmission and delivery of voice data over a network may require efficient speech compression. In entertainment applications such as computer games, reducing the bandwidth for transmitting player-to-player voice correspondence may have a direct impact on the quality of the products and the experience of the end-users. One well-known family of speech compression coding schemes is phoneme-based speech compression. Phonemes are the basic sounds of a language that distinguish different words in that base language. To perform phoneme-based coding, phonemes in speech data are extracted so that the speech data can be transformed into a phoneme stream which is represented symbolically as a text string, in which each phoneme in the stream is coded using a distinct symbol.

With a phoneme-based coding scheme, a phonetic dictionary may be used. A phonetic dictionary characterizes the sound of each phoneme in the base language. It may be speaker-dependent or speaker-independent, and can be created via training using recorded spoken words collected with respect to the underlying population (either a particular speaker or a predetermined population). For example, a phonetic dictionary may describe the phonetic properties of different phonemes in terms of expected rate, tonal pitch and volume. When based on American English, there are a set of 40 different phonemes, according to the International Phoneme Association (24 consonants and 16 vowels).

What is known as a "voice font" may be the phoneme patterns for all 40 phonemes stored in the phoneme dictionary. However, for higher quality voice fonts, sub-phoneme units, such as, for example, bi-phones or even smaller units are typically stored as the voice font. Thus, there can be an essentially unlimited number of voice fonts that can be created, by modifying one or more of the phoneme or sub-phoneme patterns in a stored set.

There may arise situations where an individual may desire to select a "voice font" other that his/her natural voice for a speech signal transmission. Some systems exist that store a limited number of different voice fonts in a memory associated with an individual's communication device (e.g., cell phone, computer, etc.). However, as the number of voice fonts increases, the ability to store and/or update a listing of voice fonts has become problematic.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method for utilizing a network repository having stored voice font data is provided. A request for a response, including the voice font data stored in the network repository; is received via a network. The voice font data stored in the network repository is accessed. The response, including the voice font data, is sent via the network.

In a second aspect of the invention, a machine-readable medium having instructions recorded thereon for at least one processor is provided. The machine-readable medium includes instructions for receiving, via a network, a request for a response including voice font data stored in a network repository, instructions for accessing the voice font data stored in the network repository, and instructions for sending the response including the voice font data via the network.

In a third aspect of the invention, a system is provided. The system includes at least one processor, a memory, storage arranged to store voice font data for voice synthesis, a network communication device arranged to communicate via a network, and a bus for connecting the at least one processor, the memory, the storage, and the network communication device. The at least one processor is arranged to receive a request, via a network, for the voice font data stored in the storage, access the voice font data stored in the storage, and send the response including the voice font data via the network.

In a fourth aspect of the invention, an apparatus is provided. The apparatus includes means for receiving, via a network, a request for a response including voice font data stored in a network repository, means for accessing the voice font data stored in the network repository, and means for sending the response including the voice font data via the network.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Exemplary System

Figure 1:
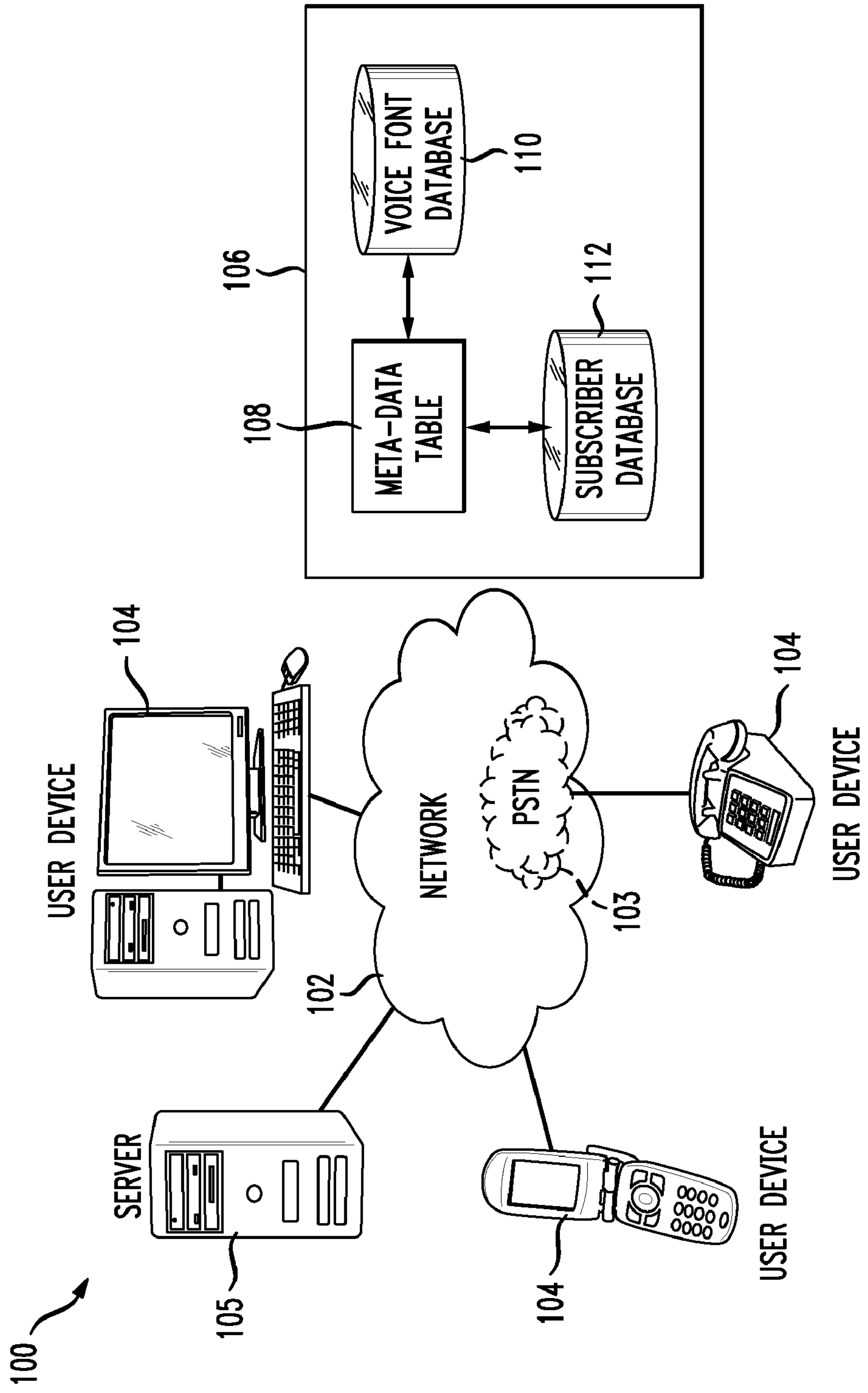
FIG. 1 illustrates an exemplary operating environment for implementations consistent with principles of the invention.

FIG. 1 illustrates an exemplary system 100 in which embodiments of the invention may be implemented. System 100 may include a network 102, one or more user devices 104, one or more processing devices, such as, for example, server 105, and a network repository 106. Network repository 106 may include a meta-data table 108, a voice font database 110, and a subscriber database 112.

Network 102 may include one or more networks, such as, for example, an Internet Protocol (IP) network capable of carrying voice over IP (VoIP) packets or other types of networks capable of carrying synthesized voice messages as well as other data. Network 102 may also include a public switched telephone network (PSTN) 103 and may include a wireless telephone network (not shown).

User device 104 may be a conventional telephone (connected to PSTN 103), a processor device such as, for example, a personal computer, a handheld computer, a cell phone with a processor, a conventional telephone, or other device capable of receiving voice font data, playing synthesized voice, based at least partly on the received voice font data, or receiving a signal corresponding to synthesized voice and reproducing the corresponding synthesized voice.

Server 105 may be a processing device, such as, for example, a personal computer or other processing device capable of receiving voice font data and text and generating synthesized voice data based, at least in part on the voice font data and the text.

Network repository 106 may include a processing device with meta-table 108, which has information describing multiple features of one or more voice fonts stored in voice font database 110.

Voice font database 110 may be a database that includes storage for data with respect to multiple voice fonts and may also include information pertaining to a fee for use of a particular voice font as well as access restriction data pertaining to use of one or more voice fonts.

Subscriber database 112 may include information pertaining to a subscriber, such as, for example, userID, password, default voice font, etc. Further, subscriber database 112 may include more than one default voice font for a user's use. For example, a user may have a default voice font for personal messages and a default voice font for business messages.

Exemplary Processing Device

Figures 2, 3:
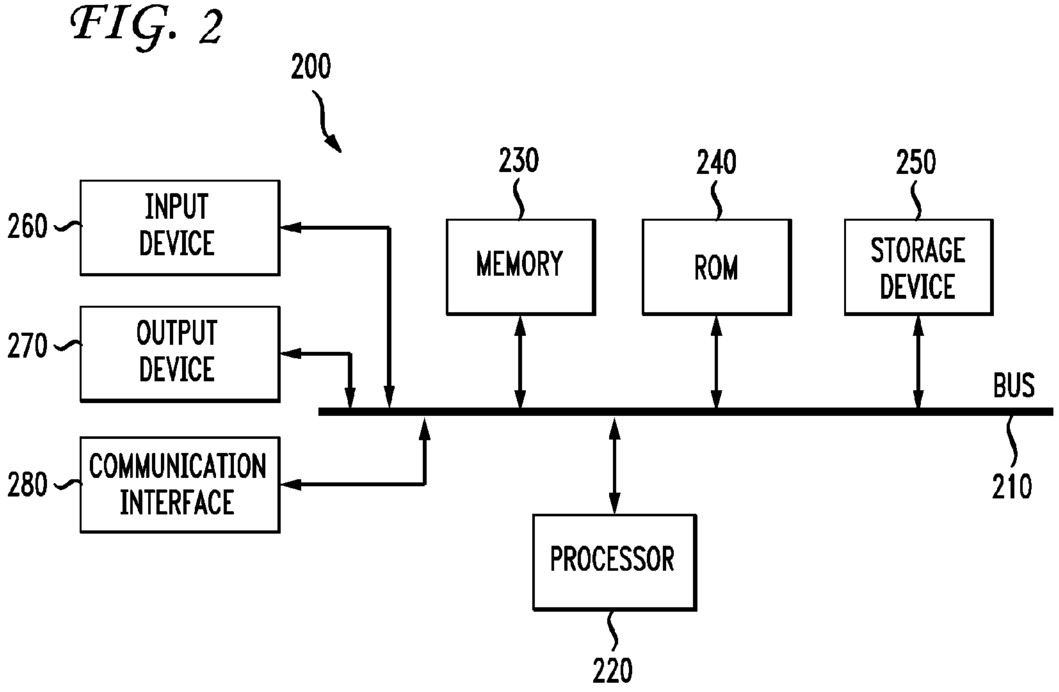
FIG. 2 is a functional block diagram of an exemplary processing device which may be used in implementations consistent with the principles of the invention.
FIG. 3 illustrates an exemplary meta-table which may be employed in a network repository consistent with the principles of the invention.

FIG. 2 is a block diagram of exemplary processing device 200, which may be used to implement user device 104, server 105, or network repository 106 in various implementations consistent with the principles of the invention. Processing device 200 may include a bus 210, a processor 220, a memory 230, a read only memory (ROM) 240, a storage device 250, an input device 260, an output device 270, and a communication interface 280. Bus 210 may permit communication among the components of processing device 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive, as well as memory, such as, RAM. In some implementations consistent with the principles of the invention, storage device 250 may store and retrieve data according to a database management system.

Input device 260 may include one or more conventional mechanisms that permit a user to input information to system 200, such as a keyboard, a mouse, a pen, a voice recognition device, a microphone, a headset, etc. Output device 270 may include one or more conventional mechanisms that output information to the user, including a display, a printer, one or more speakers, a headset, or a medium, such as a memory, or a magnetic or optical disk and a corresponding disk drive.

Communication interface 280 may include any transceiver-like mechanism that enables processing device 100 to communicate via a network. For example, communication interface 280 may include a modem, or an Ethernet interface for communicating via a local area network (LAN). Alternatively, communication interface 180 may include other mechanisms for communicating with other devices and/or systems via wired, wireless or optical connections.

Processing device 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

When processing device 200 is used as user device 104, processing device may be, for example, a personal computer (PC), a handheld computer, a cell phone, or any other type of processing device. When processing device 200 is used as server 105 or network repository 106, processing device 200 may be a personal computer or other processing device.

In alternative implementations, such as, for example, a distributed processing implementation, a group of processing devices 200 may communicate with one another via a network such that various processors may perform operations pertaining to different aspects of the particular implementation.

Exemplary Meta-Table

FIG. 3 illustrates an exemplary meta-table 300 that may be included in network repository 106 in implementations consistent with the principles of the invention. Meta-table 300 may include features pertaining to voice fonts, such as, for example, gender, age, language, accent, tone, quality, restrictions, font name, and a pointer to the voice font data for the particular font in voice font database 110. Exemplary meta-table 300 has four voice font entries, although an actual meta-table may have fewer or more entries and may have fewer or more features, as well as different features.

With respect to each of the exemplary features of meta-table 300, GENDER may have a value of "MALE" or "FEMALE", AGE may have a value corresponding to a particular age (in years) or an age range, language may have a value indicating language spoken, accent may have a value indicating a particular accent, such as, for example, a regional accent or an accent pertaining to a particular country, TONE may have a value indicating an emotional tone, such as, for example, "HAPPY", "ANGRY", etc., QUALITY may have a value indicating a quality of synthesized voice to be produced based on the particular voice font, such as, for example, "High", "Medium", or "Low", or any other suitable set of values, RESTRICTIONS may have a value indicating whether certain user-restrictions are placed on who may use the particular voice font, or whether the voice font may be used only upon payment of a fee, NAME may be a name for the voice font and may be an alphanumeric value, and POINTER, may be a pointer to the particular voice font in voice font database 110.

Entry 302 of exemplary meta-table 300 describes a voice font for a synthesized voice of a male in his 20's who speaks English with a southern accent. The tone of the font is energetic and can be used to produce a high quality synthesized voice with no restrictions on use. The voice font name is DREW and pointer 1 points to the corresponding voice font data in voice font database 110.

Entry 304 describes a voice font for a synthesized voice of a female child of about 6 years of age who speaks English with a Midwestern accent and with a happy tone. The quality of the synthesized voice to be produced using the voice font is medium with no restrictions on use. The voice font has a name of LILY and pointer 2 points to the corresponding voice font data in voice font database 110.

Entry 306 describes a voice font for a synthesized voice of a female in her 30's who speaks English with a French accent and with a playful tone. The quality of the synthesized voice to be produced using the voice font is high and may be used by paying a fee. The voice font has a name of CELEB1 and pointer 3 points to the corresponding voice font data in voice font database 110.

Entry 308 describes a voice font for a synthesized voice of a male in his 40's who speaks Spanish with a Mexican accent and with an angry tone. The quality of the synthesized voice to be produced using the voice font is medium and use of the font is subject to user access restrictions. The voice font has a name of USER1 and pointer 4 points to the corresponding voice font data in voice font database 110.

Exemplary Processes

Figure 4:
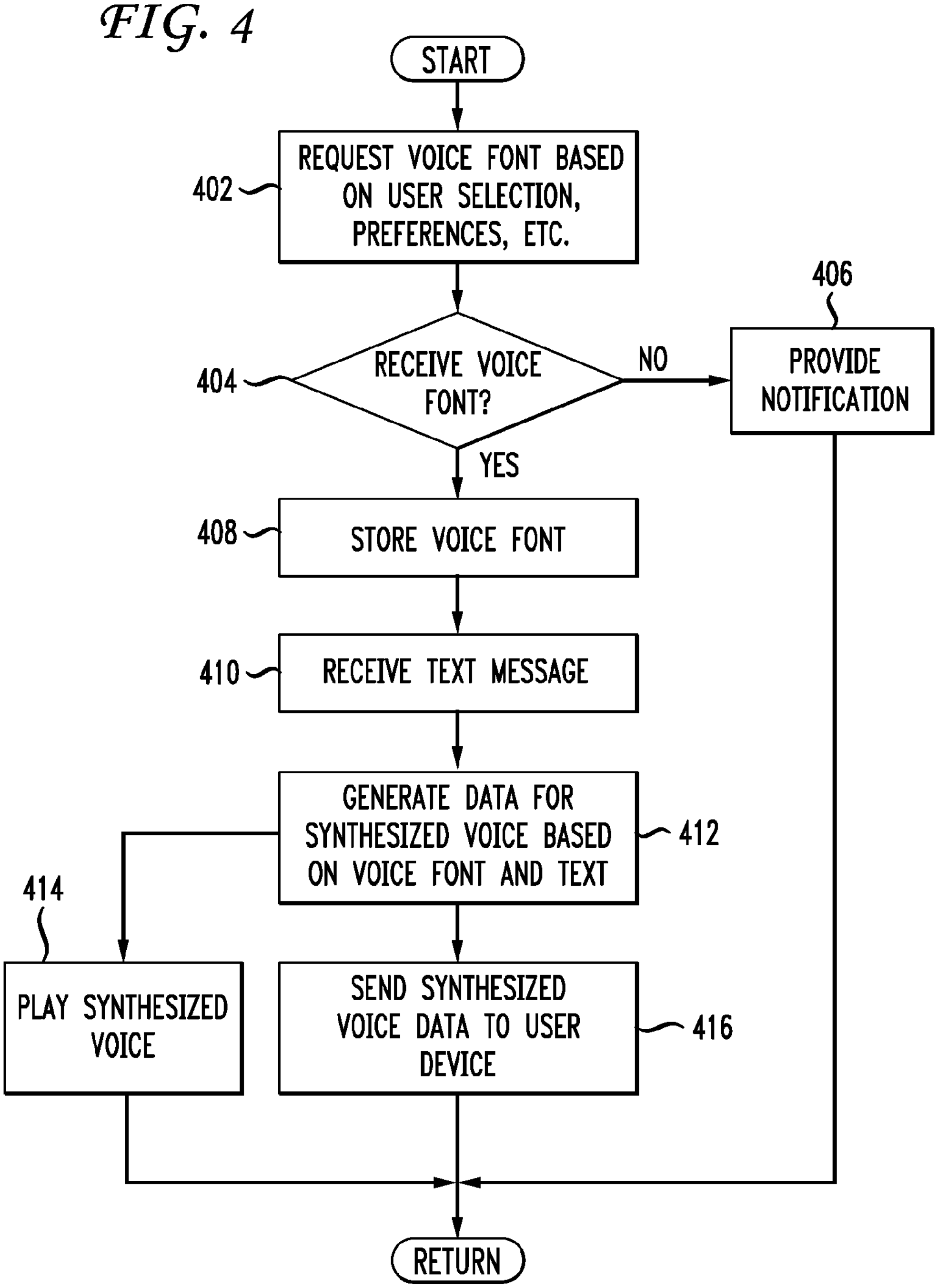
FIG. 4 is a flowchart of an exemplary process which may be performed in implementations consistent with the principles of the invention.

FIG. 4 shows an exemplary flow chart of a process that may be employed in implementations consistent with the principles of the invention. The process may be implemented in user device 104, or server 105.

Assuming that user device 104 is a processing device, the process may begin with user device 104 requesting a particular voice font based on a user selection, a previously-defined user-preference, or via another means (act 402). In one implementation, a user may browse information in meta-table 300 via, for example, a browser or other means, and may select a voice font from the meta-table via any one of a number of input means, such as, for example, making a selection from a display using a pointing device, such as a computer mouse, an electronic stylus, or a user's finger on a touch screen display. Other means of indicating a desired voice font may also be used, such as, for example, a microphone and a speech recognizer, whereby a user may provide a verbal indication of a desired voice font.

User device 104 may then send a request for the desired voice font to network repository 106 via network 102 (act 404). User device 104 may then determine whether the requested voice font is received (act 404). If the voice font is not received (which may be determined by a timeout event or an error notification), user device 104 may provide a notification to a user that the desired voice font is currently not available (act 406). This may be achieved via a displayed message, an audio signal, or another suitable means.

If the voice font is received by user device 104, the voice font may be stored in memory 230 or storage device 250 (act 408). User device 104 may then receive a text message (act 410). The text message may be, for example, an e-mail message, an instant message, a text document, keyboard input, or other textual input. User device 104 may then generate synthesized voice data based on the text message and the received voice font (act 412). The received voice font data may be in any known voice font data format or may be in a voice font format not yet developed. User device 104 may play a synthesized voice corresponding to the voice font data via output device 270 (act 414), such as, for example, a speaker, or a headset and the user will hear a synthesized voice speaking the text message.

A variation of the exemplary process of FIG. 4 may also be implemented in a processing device, such as server 105. In this example, we assume that user device 104 is a conventional telephone. Acts 402-412 may be performed by server 105 essentially as discussed above, with respect to the previous example. Server 105 may then play the synthesized voice data (act 414) through a connection from server 105, via network 102 (including PSTN 103) to user device 104 (a conventional telephone, in this example), where a user will hear the synthesized voice speaking the text message. The connection may be established by a user of user device 104 making a call to a message retrieval application or other application.

In a variation of the above-mentioned second example, the exemplary process of FIG. 4 may be implemented in a processing device, such as server 105. However, in this example, we assume that user device 104 is a stationary processing device or a portable processing device, such as, for example, a cell phone, a handheld computer with a speaker, earphone, or headset, or another portable processing device capable of outputting a voice.

Acts 402-412 may be performed essentially as discussed above, with respect to the previous examples. Server 105 may then send the generated synthesized voice data to user device 104 (act 416), which may play the synthesized voice data so that a user may hear the corresponding synthesized voice speak the test message. Alternatively, server 105 may play the synthesized voice data (act 414) through a connection from server 105, via network 102 to user device 104 via, for example, a wireless connection. The user will subsequently hear the synthesized voice speaking the text message via user device 104. The connection may be established by a user of user device 104 making a wireless call to a message retrieval application or other application.

Figure 5:
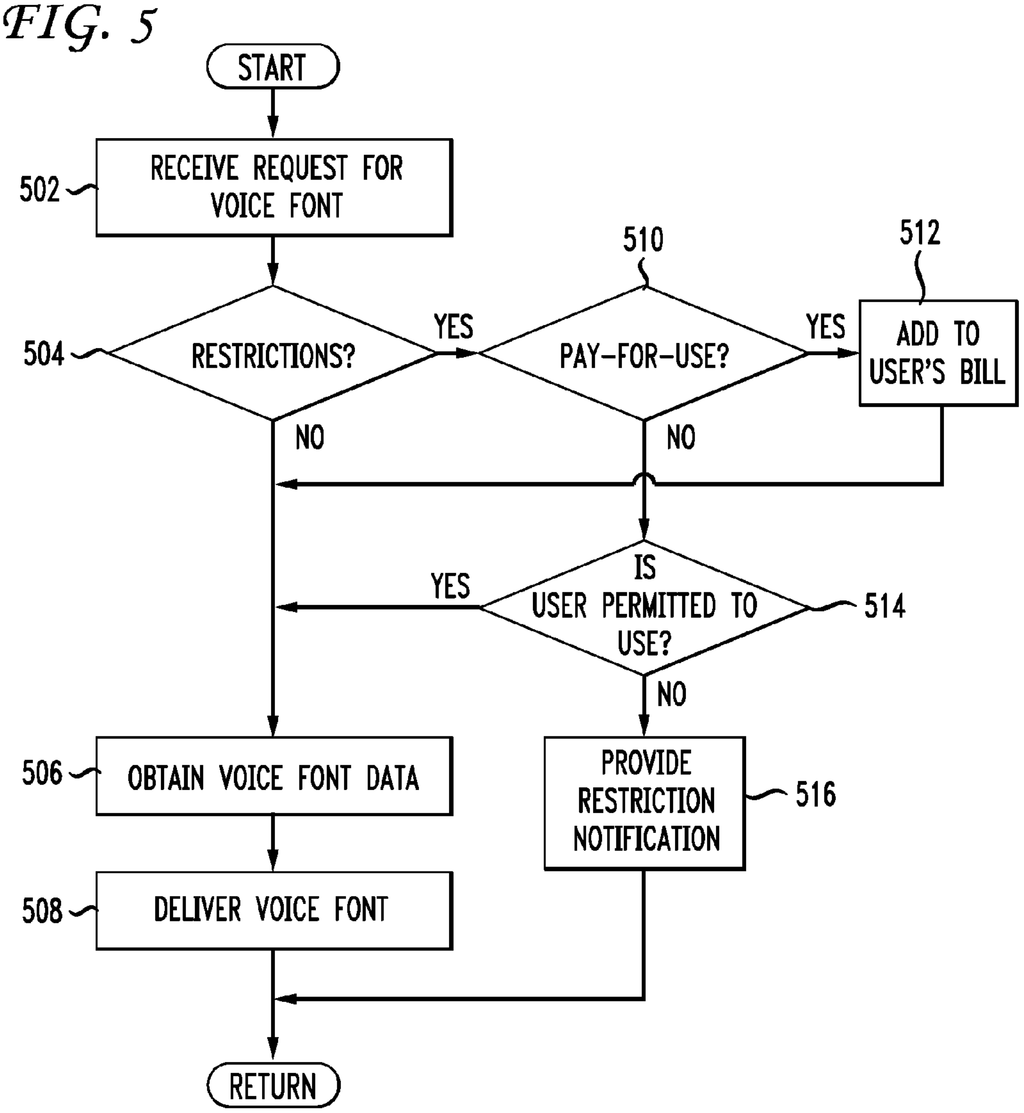
FIG. 5 is a flowchart of another exemplary process which may be performed in implementations consistent with the principles of the invention.

FIG. 5 is a flowchart that illustrates an exemplary process that may be implemented in network repository 106 consistent with the principles of the invention. First, network repository 106 may receive a request for a particular voice font (act 502). Network repository may then access a table, such as, for example, meta-table 300 to determine whether there are any restrictions on the use of the requested voice font (act 504). If network repository 106 determines that there are no restrictions on the use of the requested voice font, then network repository 106 may access voice font database 110 to obtain the corresponding voice font data (act 506) and may then deliver the voice font data to the requesting device (act 508). In an alternative implementation, the requesting device may include delivery data with the voice font request such that network repository 106 may deliver the voice font to a device different from the requesting device.

If network repository determines that the requested voice font is restricted (act 504), then network repository 106 may determine if the restriction concerns charging a fee for use of the voice font (act 510). If the restriction does concern charging a fee for use of the voice font, network repository 106 may access subscriber database 112 to determine whether the particular subscriber, who may have previously been identified by entering a userID/password combination or by another identification means, is authorized to access a pay-for-use voice font and may add the particular fee to the subscriber's account (act 512) before obtaining the particular voice font (act 506) and delivering the voice font (act 508).

If network repository 106 determines that the requested voice font is restricted (act 504) and that use of the voice font does not include charging the subscriber a fee (act 510), then network repository 106 may determine whether the subscriber is permitted to use the requested voice font (act 514). This may be achieved by referring to voice font database 110 which may include access restriction data with respect to particular voice fonts. If network repository 106 determines that the subscriber is not permitted access to the voice font, then network repository 106 may provide a restriction notification to the requesting device (act 516).

Fees

Implementations consistent with the principles of the invention may permit a fee to be charged for use of certain ones of the voice font data. For example, a fee may be charged for voice font data that can be used to synthesize a celebrity voice. The fee a subscriber may be charged may be based on the number of times the particular voice font data is requested, the particular individual or celebrity whose voice is to be synthesized, and/or a quality associated with the synthesized voice to be produced using the voice font. Further, network repository 106 may provide some voice font data, such as, for example, pay-for-use voice font data, such that it can be used only a predetermined number of times, such as, for example, one time, or a specific number of times based on, for example, an amount of a fee to be paid by a subscriber.

Miscellaneous

In implementations consistent with the principles of the invention, network repository 106 may receive new voice font data from a device and may store the voice font data in voice font database 110. The voice font data may be received via network 102 or may be received locally along with configuration data, such as, for example, access restrictions, pay-for-use data, and feature information, as well as other information, for a new meta-table entry.

CONCLUSION

Although the above description may contain specific details, they should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described, or may implement acts in a different order than as shown. For example, with respect to the exemplary process described in FIG. 4, the voice font may be stored after receiving a text message, instead of before receiving the text message, or the text may be received at some other point in the process. Accordingly, the appended claims and their legal equivalents should only define the invention, rather than any specific examples given.

We claim as our invention:

1. A method for utilizing a centralized network repository having stored voice font data, the method comprising:

receiving, via a network and from a first device, a request for a response including voice font data stored in a centralized network repository to yield requested voice first data;

accessing the requested voice font data stored in the centralized network repository;

sending the response including the requested voice font data via the network to yield a sent response, wherein the centralized network repository is separated in the network from the first device and separated via the network from a second device that receives the sent response; and charging a fee for use of the requested voice font data that is based at least in part on a quality level of the requested voice font data.

2. The method of claim 1, further comprising:

receiving, from a device, the voice font data at the centralized network repository via the network; and storing the requested voice font data in the centralized network repository.

3. The method of claim 1, further comprising:

receiving textual data at a processing device;

receiving the requested voice font data from the centralized network repository via the network; and generating, at the processing device, synthesized voice data for speaking the textual data, based at least in part on the textual data and the requested voice font data.

4. The method of claim 3, further comprising sending the synthesized voice data to a device of a user.

5. The method of claim 1, wherein the requested voice font data includes user-selectable voice font data from the centralized network repository.

6. The method of claim 1, wherein:

an amount of the charged fee is based, at least in part, on a number of times the requested voice font data is used by a user.

7. The method of claim 1, further comprising:

restricting access to use of at least some of the requested voice font data.

8. A non-transitory machine-readable storage medium having instructions recorded thereon that when executed by a computer causes the computer to perform steps comprising:

receiving, via a network and from a first device, a request for a response including voice font data stored in a centralized network repository to yield requested voice first data;

accessing the requested voice font data stored in the centralized network repository;

sending the response including the requested voice font data via the network to yield a sent response, wherein the centralized network repository is separated in the network from the first device and separated via the network from a second device that receives the sent response; and charging a fee for use of the requested voice font data that is based at least in part on a quality level of the requested voice font data.

9. The non-transitory machine-readable storage medium of claim 8, the instructions further comprising:

receiving, from a device, the requested voice font data at the centralized network repository via the network; and storing the requested voice font data in the centralized network repository.

10. The non-transitory machine-readable storage medium of claim 8, the instructions further comprising:

receiving textual data at a processing device;

receiving the requested voice font data from the centralized network repository via the network;

instructions for generating, at the processing device, synthesized voice data for speaking the textual data, based at least in part on the textual data and the requested voice font data.

11. The non-transitory machine-readable storage medium of claim 10, further comprising instructions for sending the synthesized voice data to a device of a user.

12. The non-transitory machine-readable storage medium of claim 8, the instructions further comprising:

permitting a user to select one of a plurality of voice font data types from the centralized network repository.

13. The non-transitory machine-readable storage medium of claim 8, wherein:

an amount of the charged fee is based, at least in part, on a number of times the voice font data is used by a user.

14. The non-transitory machine-readable storage medium of claim 8, the instructions further comprising:

restricting access to use of at least some of the voice font data.

15. A system comprising:

at least one processor;

a memory;

centralized network storage arranged to store requested voice font data for voice synthesis, a network communication device arranged to communicate via a network; and a bus for connecting the at least one processor, the memory, the storage, and the network communication device, wherein:

the at least one processor is arranged to:

receive a request, via a network and from a first device, for the voice font data stored in the centralized network storage to yield requested voice font data;

access the requested voice font data stored in the centralized network storage;

send the response including the requested voice font data via the network to yield a sent response, wherein the centralized network repository is separated in the network from the first device and separated via the network from a second device that receives the sent response; and charging a fee for use of the requested voice font data that is based at least in part on a quality level of the requested voice font data.

16. The system of claim 15, wherein the at least one processor is further arranged to:

receive user voice data from a device via the network; and store the user voice data in the centralized network storage.

17. The system of claim 15, wherein the voice font data includes user-selectable voice font data.

18. The system of claim 15, wherein:

an amount of the charged fee is based, at least in part, on a number of times the voice font data is used by a user.

19. An apparatus comprising:

a first module configured to control the processor to receive, via a network and from a first device, a request for a response including voice font data stored in a centralized network repository to yield requested voice font data;

a second module configured to control the processor to access the requested voice font data stored in the centralized network repository;

a third module configured to control the processor to send the response including the requested voice font data via the network to yield a sent response, wherein the centralized network repository is separated in the network from the first device and separated via the network from a second device that receives the sent response; and a fourth module configured to control the processor to charge a fee for use of the requested voice font data that is based at least in part on a quality level of the requested voice font data.

* * * * *